United States Patent [19]

Thorpe

[11] 4,049,749
[45] Sept. 20, 1977

[54] PIGMENTABLE LOW-PROFILE POLYESTER MOLDING COMPOSITIONS

[75] Inventor: Donald H. Thorpe, Williamsville, N.Y.

[73] Assignee: Hooker Chemicals & Plastics Corporation, Niagara Falls, N.Y.

[21] Appl. No.: 636,872

[22] Filed: Dec. 2, 1975

[51] Int. Cl.$^2$ .................... C08L 33/12; C08L 67/06
[52] U.S. Cl. .................... 260/862; 260/40 R; 260/42.29; 260/42.52; 526/16; 526/328
[58] Field of Search .................. 260/862, 873; 526/16, 526/328

[56] References Cited

U.S. PATENT DOCUMENTS

| | | | |
|---|---|---|---|
| 3,267,176 | 8/1966 | Mahlman | 260/862 |
| 3,740,353 | 6/1973 | Patrick et al. | 260/862 X |
| 3,780,141 | 12/1973 | Jin et al. | 260/862 X |
| 3,839,171 | 10/1974 | Akamatsu et al. | 260/862 X |
| 3,883,612 | 5/1975 | Pratt et al. | 260/862 |

*Primary Examiner*—Howard E. Schain
*Assistant Examiner*—W. C. Danison, Jr.
*Attorney, Agent, or Firm*—Peter F. Casella; James F. Mudd; William G. Gosz

[57] ABSTRACT

Polymerizable molding compositions having excellent pigmentability and dimensional stability comprise:

A. polymerizable polyester component and

B. an additive component comprising discrete particles of less than about 50 microns diameter of a cross-linked acrylate polymer having a glass transition temperature of below about 75° Celsius and which is chemically inert with respect to the polyester component and is swellable but insoluble therein. The additive component comprises the lightly cross-linked reaction product of at least one monofunctional acrylate monomer and at least one polyfunctional acrylate monomer.

18 Claims, No Drawings

PIGMENTABLE LOW-PROFILE POLYESTER MOLDING COMPOSITIONS

BACKGROUND OF THE INVENTION

This invention relates to polyester molding compounds and additives therefor characterized by uniform pigmentability and dimensional stability.

For many years polyester resins based on an unsaturated polyester and an unsaturated monomer, such as styrene, have been used in the preparation of molding compositions. When formulated in a known manner with appropriate adjuvants such as fillers, pigments, curing agents, reinforcing agents, and the like, such polyester-based molding compositions may be used in conventional molding processes such as sheet molding or bulk molding to prepare a wide variety of materials or articles which are generally characterized by high strength, light weight and excellent chemical resistance. However, articles fabricated from such molding compositions by conventional molding techniques commonly exhibit poor dimensional stability, due in a large part to shrinkage during the molding process. The poor dimensional stability is typcially evidenced by a rough or warped surface (high profile) and surface irregularities such as deep sink marks opposite structural ribs. Thus, considerable difficulties are encountered in the production of molded articles where close size and shape tolerance limits are required since in many instances an inordinate amount of labor is required after removal of a part from the mold to shape it to the exact finish, size or shape required for a given application.

Considerable effort has been expended in recent years, in the development of dimensionally stable (low-profile) polyester molding compositions. It is now well known to those skilled in the art that with the addition of thermoplastic polymers to polyester systems, such as polyester-styrene based resins, there may be prepared compositions which, when formulated with the appropriate adjuvants to form molding compounds, display minimal shrinkage or expansion during the molding process and may be formed with smooth surfaces (low-profile). The thermoplastic polymers which have been used for this purpose include, for example, such materials s polyvinyl acetate, cellulose acetate, cellulose butyrate, polymethyl methacrylate, polystyrene, polyethylene, polyvinyl chloride and saturated polyesters.

With the advent of low-profile unsaturated polyester systems, molding techniques have been increasingly employed in the fabrication of automotive parts such as hood scoops, fender extensions and a wide variety of other parts which require both a smooth surface and close adherence to the size and shape of a precision machined mold.

In the production of articles such as automotive parts, it is particularly desirable to impart the desired color to the article by addition of a pigment to the molding compound prior to the molding process. This technique eliminates the need for an additional coating step after molding, and in general, minimizes maintenance and extends the useful life of the article since the color is dispered throughout the material rather than only on the surface. However, it has been found that, in low profile unsaturated polyester molding compounds containing thermoplastic additives, the achievement of uniform coloration is difficult at best. The addition of a thermoplastic polymer, with the exception of polyethylene and polystyrene, to an unsaturated polyester molding compound, results in a non-uniform distribution of the pigment and a "phase out" or separation of non-pigmented and pigmented areas during molding or curing. The result is an undesirable mottled appearance of the surface. When polyethylene or polystyrene is employed as the thermoplastic polymer additive, considerable improvement in the uniformity of pigmentation is achieved. However, the dimensional stability, although improved by the addition of polyethylene or polystyrene is notably less than that achieved with other thermoplastic polymer additives, which phase out during molding or curing. Thus a manufacturer utilizing molding compounds which incorporate thermoplastic polymer additives must choose betweeen a thermoplastic polymer which imparts good surface smoothness and dimensional stability, but which cannot be pigmented uniformly, and a thermoplastic polymer which imparts good pigmentability but is substantially poorer in surface smoothness and dimensional stability.

Accordingly, it is an object of the present invention to provide unsaturated polyester based molding compositions which exhibit a high degree of dimensional stability and which may be uniformly pigmented. It is a further object to provide low-profile additive compositions which may be added to unsaturated polyester based molding compositions to impart a high degree of dimensional stability thereto without adverse effect on the pigmentability of the composition. It is a still further object to provide a method for the production of molded articles from unsaturated polyester based molding compounds, wherein the molded articles are uniformly pigmented and are within close tolerance limits of the size and shape imparted by the mold. It is an additional object to provide articles of manufacture molded from novel polymeric compositions and having uniform pigmentation and closely reproducible size and shape.

SUMMARY OF THE INVENTION

It has been found that polyester molding compositions having excellent pigmentability and dimensional stability comprise a mixture of (A) polymerizable polyester component, and (B) an additive component comprising discrete particles of less than about 50 microns diameter of a cross-linked acrylate polymer having a glass transition temperature (Tg) of less than about 75° Celsuis and which is chemically inert with respect to the polyester component and is swellable, but insolutable therein, the additive component comprising the reaction product of at least one monofunctional acrylate monomer and at least one polyfunctional acrylate monomer. The low profile polyester molding compositions of this invention are characterized by dimensional stability, that is smooth surfaces and little or no shrinkage during molding and curing, as well as uniformity of pigmentation or evenness of color in the final molded article.

The present invention may be considered in terms of three major aspects thereof:

a. novel low profile additives which may be incorporated unsaturated polyester molding compositions to impart dimensional stability thereto without adverse effect on pigmentability;

b. unsaturated polyester molding compositions containing the novel low profile additives; and c. molded articles of manufacture prepared therefrom.

Although the unsaturated polyester molding compositions are described in terms of major components thereof, that is the unsaturated polyester component and the additive component, it will be appreciated that, in accordance with known practice, the molding composition may also include additional appropriate ingredients including, for example, fillers, lubricants, pigments, fire retardants, curing agents, reinforcing agents, mold release agents, and the like. The molding compositions of this invention may be uniformly pigmented with organic or inorganic pigments. Pigments for the coloration of polymer compositions may be employed as a powder or as a paste or dispersion in a vehicle that is compatible with the type of polymer to be pigmented. Thus, for example, pigments formulated as a color paste or dispersion in a polyester resin vehicle compatible with polyester resin compositions such as those of the present invention may be employed. However, if desired a pigment per se or a pigment dispersed in various other vehicles compatible with polyester resins may be employed. In one embodiment, the pigment may be dispersed or admixed with the additive component of this invention prior to incorporation in the polyester molding composition.

DESCRIPTION OF EMBODIMENTS

The Polyester Component

The polymerizable polyester component of the molding compositions of this invention comprises an unsaturated polyester and preferably, in addition thereto, a copolymerizable monomer.

The unsaturated polyesters which may be employed include those commonly known in the art, and are generally the reaction product of a polycarboxylic compound and a polyhydric alcohol. The preferred polycarboxylic compounds and polyhydric alcohols are dicarboxylic compounds and dihydric alcohols. Carboxylic compounds and alcohols having a functionality greater than two may be employed, usually in minor amounts. In such cases it may be advantageous to incorporate a compensatory amount of monofunctional acid and/or alcohol to control molecular weight and gelatin as desired. By polycarboxylic compounds is meant the polycarboxylic acids, polycarboxylic anhydrides, polycarboxylic acid halides, and polycarboxylic acid esters. The unsaturation can be provided in either or both the polycarboxylic compound or the polyhydric alcohol. Suitable unsaturated polycarboxylic acids having aliphatic carbon-to-carbon double bonds, and the corresponding acid halides, esters, and anhydride can include for example, maleic, fumaric, chloromaleic, ethyl-aleic, itaconic, citraconic, mesaconic, aconitric and acetylene dicarboxylic, and the like either alone or in mixtures.

Illustrative of the unsaturated polyhydric alcohols having aliphatic carbon-to-carbon double bonds, which can be used in providing the unsaturation in the linear polyester molecules are compounds such as butene diol, pentene diol, the unsaturated hydroxy ethers such as allyl or vinyl glycerol ethers, allyl or vinyl pentaerythritol ethers and the like and mixtures thereof.

The saturated polycarboxylic compounds useful in the preparation of the polyesters can be aliphatic, cycloaliphatic, aromatic or heterocyclic. Illustrative of these polycarboxylic acids, acid halides, acid anhydrides and acid esters include phthalic, isophthalic, terephthalic, tetrachlorophthalic, tetrabromophthalic, dibromotetrahydrophthalic, chlorendic, adipic, succinic, dichlorosuccinic, and the like and mixtures thereof.

Suitable saturated polyhydric alcohols for use in the preparation of the polyester resins include ethylene glycol, diethylene glycol, propylene glycol, dipropylene glycol, butane diol, pentane diol, hexane diol, dibromoneopentyl glycol, 1,4-cyclohexane dimethanol, glycerol, mannitol, sorbital, bisphenols, substituted bisphenols, hydrogenated bisphenols and mixtures thereof.

The properties of the polyester resins can be modified by the incorporation of suitable monofunctional carboxylic compounds and alcohols. Illustrative examples of such compounds are 2,2-dichlorethanol; 1,1-dibromo-2-propanol; 2,2,2-tribromoethanol; 1,1,3,3-tetrabromo-2-propanol; 1,1,1-trifluoro-2-propanol and 2,3-dibromo-1-propanol. An example of a carboxylic compound is pentachlorophenoxy acetic acid.

The properties of the polyesters can be varied by using mixtures of the various types of acids and alcohols, such as an unsaturated acid, a saturated acid and an saturated alcohol.

The temperature for the reaction between polyhydric alcohols and polybasic acids ranges from about one hundred to two hundred degrees Celsius, although higher or lower temperatures can be used. Esterification catalysts such as para-toluene sulfonic acid, benzene sulfonic acid, betanaphthalene sulfonic acid and the like, or amines such as pyridine, triethyl amine, quinoline and the like can be added to the reaction mixture. The proportion of polyhydric alcohol is approximately controlled by the total mole proportion of acids in the esterification reaction mixture. It is also preferred to react the polyhydric alcohols and polybasic acids in roughly equimolar proportion; however, either the acids or alcohols can be used in substantial excess, if it is desired to form a low molecular weight polyester resin.

The aforementioned unsaturated polyesters and components thereof are intended to be illustrative of polyesters suitable for the compositions of this invention and are not intended to be all-inclusive. The molecular weight of the polymerizable unsaturated polyester is not critical and may vary over a wide range. Typically, the average molecular weight will be in a range of from about 500 or less to about 10,000, or higher and preferably from about 700 to about 6000.

A variety of ethylenically unsaturated copolymerizable monomers can be used for curing or cross-linking the ethylenically unsaturated polyesters. The monomer is preferably liquid at reaction temperatures, has the ability to dissolve the unsaturated polyester and is copolymerizable therewith to form a cross-linked structure. Suitable monomers are generally characterized by the presence of at least one reactive $H_2C=C<$ group per molecule. Specific examples of such monomers include styrene, chlorostyrenes, methyl styrenes such as alpha methyl styrene, p-methyl styrene, vinyl benzyl chloride, divinylbenzene, indene, fluorostyrene, unsaturated esters such as methyl acrylate, methyl methacrylate, as well as other lower aliphatic esters of acrylic and methacrylic acids, allyl acetate, diallyl phthalate, diallyl succinate, diallyl adipate, diallyl sebacate, diethylene glycol bis (allyl carbonate), triallyl phosphate and other allyl esters, and vinyl toluene, diallyl chlorendate, diallyl tetrahclorophthalate, ethylene glycol diacrylate, ethylene glycol dimethacrylate, ethylene glycol diethacrylate and the like and mixtures thereof.

The proportion of unsaturated monomer to unsaturated polyester can vary within the ultimate limits of each as necessary to produce an infusible, insoluble polyester resin. Generally the weight proportion of unsaturated monomer:unsaturated polyester will be between about 0.1 and 9.0 and preferably between about 0.25 and 7.5, part of monomer per part of polyester.

Polymerization catalysts are preferably added to the mixture of unsaturated polyester and unsaturated monomer to effect setting or curing. Catalysts such as benzoyl peroxide, acetyl peroxide, lauroyl peroxide, methylethyl ketone peroxide, cumene hydroperoxide, and the like are satisfactory. Such catalysts are commonly used in proportions of about 0.01 to 10 weight percent of the resin, depending on the efficiency of their action and whether or not substances which inhibit polymerization are present in the mixture.

For convenience in handling and mixing, a portion of the monomer may be combined with the unsaturated polyester, to serve as a solvent therefor prior to the addition of the low profile additive or other compounding ingredients and the remainder of the monomer may then be added during the formulation of the molding compound. To prevent premature polymerization during the initial mixing of the unsaturated polyester and a portion of the monomer, a polymerization inhibitor is advantageously added to the mixture or to one of its components prior to mixing, especially if the polyester-monomer solution is to be stored or shipped in commerce prior to final compounding or molding and curing. Polymerization inhibitors are generally added in amounts of about 0.001 to 1 weight percent of the mixture. Among the inhibitors which may be advantageously employed to prevent premature polymerization of the mixtures of unsaturated polyester and monomer are substances such as hydroquinone, toluhydroquinone, benzoquinone, para-tertiarybutyl catechol, paraphenylene diamine, trinitrobenzene, picric acid and the like.

The Additive Component

The additive component of the present invention comprises discrete particles of a lightly cross-linked acrylate polymer which is insoluble but swellable in the unsaturated polyester composition and which is characterized by a glass transition temperature of less than about 75° Celsius. The particles are preferably of a size range averaging less than about 50 microns and most preferably less than about 25 microns in diameter to as small as 0.1 microns or less with the only lower limit being that imposed by the difficulty of preparing discrete particles of smaller dimater. Based on ease and economy of preparation as well as achievement of low profile characteristics and pigmentability in the final product, a preferred particle size is about 3 microns to about 25 microns. Particles having a diameter of less than about 50 microns may be prepared in a known manner by emulsion or suspension polymerization techniques. Larger size particles may be reduced in size by mechanical methods such as pulverization.

The acrylate polymer is the reaction product of at least one monofunctional acrylate monomer and at least one polyfunctional unsaturated monomer, preferably aboout 75 to about 95 weight percent of the monofunctional monomer and about 5 to about 25 weight percent of the polyfunctional monomer.

The term "acrylate" is employed in this specification and claims in a generic sense to include methacrylates as well as acrylates. Where reference is made to a specific compound of this type the appropriate species name — acrylate or methacrylate — is employed.

Suitable monofunctional acrylates which may be employed include, for example esters of acrylic and methacrylic acid such as methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, s-butyl acrylate, s-butyl methacrylate, t-butyl acrylate, t-butyl methacrylate, 2-ethylhexyl acrylate, n-hexyl acrylate, n-hexyl methacrylate, n-octyl acrylate, n-octyl methacrylate, isodecyl methacrylate, lauryl methacrylate, tridecyl methacrylate, and the like as well as mixtures thereof. The preferred monofunctional acrylates are alkyl acrylates and most preferably those wheren the alkyl group if from 1 to 13 carbon atoms.

The monomer(s) are lightly cross-linked by copolymerization with a small amount, of a polyfunctional monomer preferably a di or trifunctional acrylate such as ethylene diacrylate, ethylene, dimethacrylate, 1,3,-butylene diacrylate, 1,3-butylene dimethacrylate, 1,6-hexamethylene diacrylate, 1,6-hexamethylene dimethacrylate, 1,1,1-trimethylolethene triacrylate, 1,1,1-trimethylolethane trimethacrylate, 1,1,1-trimethylolpropane triacrylate, 1,1,1-trimethylolpropane trimethacrylate, and the like as well as mixtures thereof. The preferred polyfunctional acrylate monomers are difunctional alkylene acrylates wherein the alkylene group is 2 to 8 carbon atoms and most preferably 1,3-butylene dimethacrylate.

The acrylate polymer is advantageously prepared from monomers such as those described herein above with the aid of a suitable catalyst such as a peroxide type catalyst. Typical catalyst include, for example, benzoyl peroxide, lauroyl peroxide, caprylyl peroxide, acetyl peroxide, t-butyl perbenzoate, t-butyl peroctoate and the like.

The acrylate polymer is characterized by a glass transition temperature (Tg) of less than about 75° and preferably of about −10° to abvout 50° Celsius. Particles of polymeric materials having a glass transition of less than about −10° C often exhibit a stickiness of tendence to agglomerate rather than remain as discrete particles, resulting in an unevenness of color in the final molded article. Polymers characterized by a glass transition temperature above about 75° C often exhibit insufficient thermal expansion to control dimensional stability. Acrylate polymers having a suitable glass transition temperature may be obtained by judicious selection of the monomeric components and the proportions thereof. More particularly, the monofunctional acrylate may be selected on the basis of the glass transition temperature of its homopolymer. Thus, for example, a monofunctional acrylate may be employed which, on homopolymerization will yield a polymer having a relatively low glass transition temperature. Copolymerization of such a monomer with a polyfunctional monomer to yield a lightly cross-linked polymer will result in an increase in the glass transition temperature.

The degree of crosslinking in the final polymer will depend on the amount and functionality of the polyfunctional component. The greater the degree of crosslinking, the higher the glass transition temperature of the final polymer will be. Thus, the glass transition temperature of the final product will depend on the selection of the monofunctional acrylate (based on the glass transition temperature of its homopolymer) and the degree of cross-linking. The preferred monofunctional acrylates or mixtures thereof are those capable of forming linear homopolymers or copolymers having a glass transition temperature below about 0° Celsius. Thus, when a monofunctional acrylate such as methyl methacrylate (Tg of homopolymer is about 105° C), is lightly cross-linked by copolymerization with a polyfunctional monomer such as 1,3-butylene dimethacrylate, the Tg of the resultant polymer will be too high. However, the addition of a sufficient amount of another selected monofunctional acrylate such as ethyl acrylate (Tg of homopolymer is about −22° C) or 2-ethylhexyl acrylate (Tg of homopolymer is about −85° C) will serve to lower the glass transition temperature of the final crosslinked product to an acceptable value.

The preferred acrylate polymer compositions of this invention are those terpolymers prepared from a combination comprising methyl methacrylate together with a suitable amount of a monofunctional acrylate selected from acrylates or methacrylates capable of forming linear homopolymers having a glass transition temperature below about 0° and preferably below about −20° Celsius and light cross-linked with a difunctional monomer. Preferred monofunctional acrylates which may be employed in combination with methyl methacrylate and n-butyl acrylate, ethyl acrylate, and 2-ethylhexyl acrylate. The preferred difunctional monomer is 1,3-butylene dimethacrylate. Especially preferred are terpolymers comprising the reaction product, in percent by weight, of about 5 to 75, preferably about 10 and about 60 percent methyl methacrylate, about 15 to about 75 and preferably about 35 to about 70 percent n-butyl acrylate, and about 5 to 25 and preferably about 10 to about 20 percent 1,3 butylene dimethacrylate.

The uniformity of pigmentation in the final molded article will vary somewhat depending on the shape of the low profile additive particles. For maximum uniformity of pigmentation it is preferred that the additive particles be discrete, that in non-agglomerated particles, and be substantially spherical in shape. However, good pigmentation is obtained with elongated, rounded particles. When the low profile additive particles are highly irregular in shape or when substantial agglomeration of particles occurs a tendency toward mottled or marbleized appearance may result in the final product. Emulsion or suspension polymerization methods are advantageously employed in the preparation of small, discrete, substantially spherical or rounded polymer particles, although other methods such as solution-precipitation polymerization, or bulk polymerization and subsequent pulverization of the polymeric product, may be employed.

The preferred method is suspension polymerization which may be carried out in a known manner by heating and stirring the monomeric reactants in water in the presence of a suitable catalyst, such as benzoyl peroxide or lauroyl peroxide nd a suitable suspension agent such as calcium phosphate or hydroxypropyl methylcellulose.

The control of shrinkage during the molding process and the resultant low profile of the final molded article results from the use of an acrylate polymer additive that is swellable in the unsaturated polyester composition but substantially insoluble therein. It is known that the degree to which a polymer swells in a solvent as well as the solubility of the polymer is dependent on the degree of cross-linking present in the polymeric structure. Thus, to achieve the desired control of shrinkage during the molding process the polymer additive of this invention comprises an acrylate polymer that is lightly enough cross-linked so that it is swelled in the unsaturated polyester composition but sufficiently cross-linked so that it does not dissolve therein. The degree of swelling of a polymer may be determined with the use of the known formula and procedure as follows:

$$\% \text{ Swelling} = \frac{(\text{weight of swollen polymer-weight of dry polymer}) \times 100}{\text{weight of dry polymer}}$$

(See L.H. Sperling and E.N. Mihalakis, J. Applied Polymer Science 17, 3811, (1973)).

Using the above formula the following test is employed to determine percent swelling:

Approximately 4 grams of polymer is weighed into a Soxhlet extraction thimble and placed in an extraction apparatus. Toluene (200 ml) is vigorously refluxed so that there is a steady return of fresh solvent through the polymer. After two hours, the thimble is removed and surplus solvent allowed to drain off by leaving the thimble to stand in a glass funnel for 10 minutes. The polymer is then weighed and the percent swelling is calculated using the above formula.

Based on the swelling index (percent swelling) formula and test described hereinabove, it has been found that lightly cross-linked polymers, suitable for use as low profile additives in accordance with the present invention are characterized by a swelling index of about 200% to about 600% and preferably about 200% to about 350%.

The amount of additive component which may be incorporated in the polyester molding composition may vary considerably. To achieve optimumm control of dimensional stability and uniform pigmentability of the final product, it is preferred to employ about 5 to about 45 and most preferably about 10 to about 25 parts by weight of additive component per 100 parts by weight of polyester component.

The following specific examples are provided to further illustrate this invention and the manner in which it may be carried out. It will be understood that the specific details given in the examples are provided for purpose of illustration and are not to be construed as a limitation on the invention. In the examples, unless otherwise indicated, all parts and percentages are by weight and all temperatures are in degree Celsius.

EXAMPLE 1

A mixture of 140 parts of butyl acrylate, 30 parts of methyl methacrylate, 30 parts of 1,3-butylene dimethacrylate, 1 part of Aerosol GPG, (a 70 percent solution of sodium octyl sulfosuccinate in isopropyl alcohol), and 100 parts of distilled water, was charged to a reaction vessel. The mixture was stirred rapidly while 200 parts of a 0.05 molar solution of trisodium phosphate, followed by 100 parts of a 1.5 molar solution of calcium chloride was added. To the resultant suspension was added 2 parts of lauroyl peroxide. The suspension was heated to 70° C. After 15 to 30 minutes at 70° C, an exothermic reaction occurred. The suspension was maintained at about 70° C with external cooling. The polymerization reaction was continued for about 3 hours at which time 30 parts of concentration hydrochloric acid in 30 parts of water was added. The resultant polymer was filtered, washed free of chloride ion and oven-dired at 70° to 80° C.

EXAMPLE 2

A reaction vessel equipped with a reflux condenser with 80 parts of 1,2-propanediol, 15 parts of phthalic anhydride and 88 parts of maleic anhydride. The solution was heated at about 200° C until an acid number of 36 was obtained. Styrene, 33.3 parts was mixed with 66.7 parts of this polyester to form a solution for use in the formulation of molding compositions.

EXAMPLE 3 — Preparation of a Molding Composition (Compound).

A molding composition utilizing the polymer of Example 1 was prepared in the following manner.

A dispersion of 15 parts of the cross-linked polymer of Example 1 in 55 parts of the solution from Example 2 and 30 parts of styrene was made using a high speed stirrer. Into this dispersion was added 3 parts of a red pigment paste(CM7106, Plasticolors, Inc. Ashtabula, Ohio), 3 parts of calcium stearate mold release agent, 0.8 parts of catalyst, (1,1,3,3-tetramethylbutylperoxy-2-ethylhexanoate and 1.5 parts of magnesium hydroxide thickener. This mixture was added to a sigma blade mixer and 200 parts of ground calcium carbonate filler and 75 parts of OCF 832¼ glass fiber (Owens-Corning Fiberglass) were added and thoroughly mixed. The resulting composition was stored in a sealed container at room temperature for 24 to 72 hours before molding.

For molding, 280 parts of this composition were charged into a 8 × 8 mold containing a ⅛ by 5 rib and a ⅜ by 4½ rib. The press was closed and the specimen cured for 2 minutes at 1500 psi and 138° C.

The molded specimen has a uniform red color with a smooth surface. The surface waviness, measured with a Bendix microrecorder was 125 microinches per 1/2 inch (averaged over several similarly prepared molding compositions). The specimen has a Barcol hardness of 50 and a shrinkage of 0.1 mils per inch.

Various acrylate polymer additives were prepared according to the procedure of Example 1, varying the composition as shown in the examples below. The additives thus prepared were mixed with a polyester resin prepared as described in Example 2 in a proportion of 15 parts of additive per 55 parts of polyester and 30 parts of additional styrene as in Example 3. Bulk molding compositions were formulated from the polyester and additive and were molded following the procedure of Example 3. The molded specimens were tested in the following manner with the results as shown. Those examples which are provided for purposes of comparison are designated with the letter C following the example number.

PIGMENTATION: The uniformity of pigmentation was assessed visually on the basis of the following rating scale:

| | |
|---|---|
| Good (G) | - almost completely uniform with no more than a trace of mottling |
| Fair-Food (F-G) | - fairly uniform with slight mottling apparent |
| Fair (F) | - subdued mottling very evident |
| Poor (P) | - very mottled and light in color |

SHRINKAGE: Shrinkage was measured parallel and perpendicular to the mold ribs, using an 8-inch micrometer. Expansion is recorded as a negative (−) shrink value.

PROFILE: Profile was measured on a Bendix Microrder fitted with a 0.0005 inch stylus.

PARTICLE SIZE: Size analysis of the additive particles was obtained with an electrical sensing-zone particle analyser (the Coulter Counter, Coulter Electronics, Industrial Division) or by scanning electron microscopy (SEM). Where the electrical sensing-zone particle analyser was used the figure given in Table I indicates that 50% of the particles were smaller than that diameter. Where scanning electron microscopy was employed, the average size was estimated from photographs.

TABLE I

| | EXAMPLE NO. | | | | | |
|---|---|---|---|---|---|---|
| | 4 | 5 | 6 | 7 | 8 | 9 |
| Additive Composition (parts by weight) | | | | | | |
| Methyl methacrylate | 40 | 35 | 25 | 30 | 0 | 0 |
| n-Butyl acrylate | 45 | 45 | 57.5 | | 80 | 85 |
| ethyl acrylate | | | | 55 | | |
| 1,3-Butylene dimethacrylate | 15 | 20 | 17.5 | 15 | 20 | 15 |
| Additive Properties | | | | | | |
| Glass transition temperature (° C) | 33° | 39 | 15.5 | 17° | 12° | 3° |
| Swell Index (%) | 340 | 280 | 290 | | | |
| Particle Size (microns) | 40 | 25 | 38 | 39 | 20 | 34 |
| Properties of Molded Specimen | | | | | | |
| Pigmentation | F-G | F-G | G | F-G | G | F-G |
| Shrinkage (mils/inch) | | | | | | |
| parallel to ribs | 0.63 | 1.69 | 1.07 | 0.6 | 1.5 | 0.06 |
| perpendicular to ribs | 0.06 | 0.51 | 0.63 | −0.2 | 0.4 | −0.6 |
| Profile (microinches)/inch | | | | | | |
| at center | 183 | 170 | 180 | 145 | 230 | 155 |
| at rib | 185 | 310 | 210 | 225 | 330 | 185 |
| Barcol Hardness | 56 | 63 | 53 | 50 | 55 | 45 |

EXAMPLES 10 and 11C

The effect of paticle size of particle size on pigmentation is shown in Examples 10 and 11C below. In the examples, the additive composition was the reaction product (by suspension polymerization) of 25 parts by weight of methyl metacrylate, 57.5 parts by weight of n-butyl methacrylate and 17.5 parts by weight of 1,3-butylene dimethacrylate. The additive compositions were incorporated in a bulk molding composition and molded following the procedure of Example 3. The molded specimen were tested as described hereinabove with the results as shown:

| | Examples | |
|---|---|---|
| | 10 | 11C |
| Additive particle size (microns) | 1–15 | greater than 100 |

-continued

|  | Examples | |
| --- | --- | --- |
|  | 10 | 11C |
| Properties of molded specimen | | |
| Pigmentation | G | P |
| Shrinkage (mils/inch) | | |
| parallel to ribs | 1.26 | 1.19 |
| perpendicular to ribs | 0.07 | 0.32 |
| Profile (microinches/inch) | | |
| at center | 161 | 294 |
| at rib | 181 | 437 |

EXAMPLES 12, 13 and 14C

The effect of glass transition temperature on shrinkage control is shown in the following Examples 12, 13, and 14C. In each the swell index of the additive is within the preferred range for such purposes. However, the high glass transition temperature of the additive of Example 14C has resulted in an undesirable increase in profile variations.

|  | Examples | | |
| --- | --- | --- | --- |
|  | 12 | 13 | 14C |
| Additive components | | | |
| Methyl Methacrylate | 15 | 25 | 82.5 |
| n-butyl acrylate | 70 | 57.5 | |
| 1,3-butylene dimethacrylate | 15 | 17.5 | 17.5 |
| Additive properties | | | |
| Glass transition temperature (° C) | −6 | 12 | 145 |
| Swell Index (%) | 400 | 280 | 400 |
| Particle Size (microns) | 24 | 2−20 | 1−10 |
| Properties of Molded Components | | | |
| Pigmentation | F-G | G | F-G |
| Shrinkage (mils/inch) | | | |
| parallel to ribs | 0.19 | 0.82 | 2.06 |
| perpendicular to ribs | 0.06 | 0.38 | 0.50 |
| Profile (microinches/¼ inch) | | | |
| at center | 166 | 170 | 371 |
| at rib | 167 | 228 | 697 |
| Barcol hardness | 55 | 55 | 65 |

What is claimed is:

1. A molding composition comprising
   A. a polymerizable unsaturated polyester; and
   B. an additive component, present in an amount of about 5 to about 45 parts by weight per 100 parts by weight of polyester component, comprising discrete particles of less than about 50 microns diameter of a cross-linked acrylate polymer characterized by a glass transition temperature of less than about 75° Celsius and which is chemically inert with respect to said polyester component and is swellable but insoluble therein, said acrylate polymer consisting essentially of the reaction product of about 75 to about 95 percent by weight of at least one monoacrylate monomer and about 5 to about 25 percent by weight of at least one polyacrylate monomer.

2. A molding composition according to claim 1 wherein the additive component comprises a cross-linked acrylate polymer characterized by a glass transition temperature of less than about 50° C.

3. A molding composition according to claim 2 wherein the polyester component comprises an unsaturated polyester and a copolymerizable unsaturated monomer.

4. A molding composition according to claim 2 wherein the monoacrylate monomer consists essentially of a mixture of methyl methacrylate and at least one other monoacrylate monomer.

5. A molding composition according to claim 4 wherein the monoacrylate comprises a mixture of methyl methacrylate and at least one other monoacrylate monomer selected from n-butyl acrylate, ethyl acrylate, and 2-ethylhexyl acrylate.

6. A molding composition according to claim 5 wherein the polyacrylate monomer is a diacrylate monomer.

7. A molding composition according to claim 6 wherein the polyacrylate monomer is 1,3-butylene dimethacrylate.

8. A molding composition according to claim 7 wherein the additive component comprises a terpolymer of methyl methacrylate, n-butyl methacrylate, and 1,3-butylene dimethacrylate.

9. A molding composition according to claim 8 wherein the additive component comprises a terpolymer of about 5 to about 75 weight percent methyl methacrylate, about 15 to about 75 weight percent of n-butyl acrylate and about 5 to about 25 weight percent of 1,3-butylene dimethacrylate.

10. A low profile additive for molding compositions which comprises discrete particles of less than about 50 microns diameter of a cross-linked acrylate polymer characterized by a glass transition temperature of less than about 75° Celsius and which is the reaction product of about 75 to about 95 percent by weight of at least one monoacrylate monomer and about 5 to about 25 percent by weight of at least one acrylate polyacrylate monomer.

11. A low profile additive according to claim 10 comprising a cross-linked acrylate polymer characterized by a glass transition temperature of less than about 50° Celsius.

12. A low profile additive according to claim 11 wherein the monoacrylate monomer consists essentially of a mixture of methyl methacrylate and at least one other monoacrylate.

13. A low profile additive according to claim 11 wherein the monoacrylate monomer comprises a mixture of methyl methacrylate and at least one other monoacrylate monomer selected from n-butyl acrylate, ethyl acrylate, and 2-ethylhexyl acrylate.

14. A low profile additive according to claim 3 wherein the polyacrylate monomer is 1,3-butylene dimethacrylate.

15. A low profile additive according to claim 14 which comprises a terpolymer of methyl methacrylate, n-butyl acrylate and 1,3-butylene dimethacrylate.

16. A low profile additive according to claim 15 which comprises a terpolymer of about 5 to about 75 weight percent of methyl methacrylate, about 15 to about 75 weight percent of n-butyl acrylate and about 5 to about 25 weight percent of 1,3-butylene dimethacrylate.

17. A low profile additive according to claim 10 having admixed therewith a pigment.

18. The composition according to claim 3 when copolymerized to form an infusible product.

* * * * *